US005712487A

United States Patent [19]

Adachi et al.

[11] Patent Number: 5,712,487

[45] Date of Patent: Jan. 27, 1998

[54] LIGHT IRRADIATOR

[75] Inventors: Hidehiko Adachi; Kunihiko Yonejima, both of Yokohama, Japan

[73] Assignee: Ushiodenki Kabushiki Kaisha, Tokyo, Japan

[21] Appl. No.: 548,252

[22] Filed: Oct. 25, 1995

[30] Foreign Application Priority Data

| | | | |
|---|---|---|---|
| Oct. 25, 1994 | [JP] | Japan | 6-260028 |
| Dec. 5, 1994 | [JP] | Japan | 6-300536 |

[51] Int. Cl.[6] .......... G01J 1/00

[52] U.S. Cl. .......... 250/492.1; 250/504 R

[58] Field of Search .......... 250/492.1, 504 R; 34/278

[56] References Cited

U.S. PATENT DOCUMENTS

| | | | |
|---|---|---|---|
| 4,177,383 | 12/1979 | Knight | 250/504 R |
| 4,591,724 | 5/1986 | Fuse et al. | 250/504 R |
| 4,596,935 | 6/1986 | Lumpp | 250/504 R |
| 4,710,638 | 12/1987 | Wood | 250/504 R |
| 4,849,640 | 7/1989 | Kruishoop | 250/504 R |
| 4,983,852 | 1/1991 | Burgio | 250/504 R |

*Primary Examiner*—Bruce Anderson
*Attorney, Agent, or Firm*—Sixbey, Friedman, Leedom & Ferguson, P.C.; David S. Safran

[57] ABSTRACT

An irradiator with a cooling nozzle which projects through an opening in a mirror and has an inlet opening for cooling air positioned at a set distance from the lamp, cooling air being drawn in by the inlet opening of the cooling nozzle for enabling light with a high light intensity to be emitted from the lamp by cooling it. In this way, a lamp with a small tube diameter can be efficiently cooled without reducing the light gathering power of the mirror, and the workpiece can be irradiated with light with a high peak intensity. Furthermore, a cooling nozzle of appropriate length and internal diameter can be chosen according to the external diameter of the lamp due to the focussing mirror and the cooling nozzle being formed as separate individual parts in one embodiment. In this way, the same minor can be used with lamps of different external diameters.

13 Claims, 7 Drawing Sheets

FIG. 4
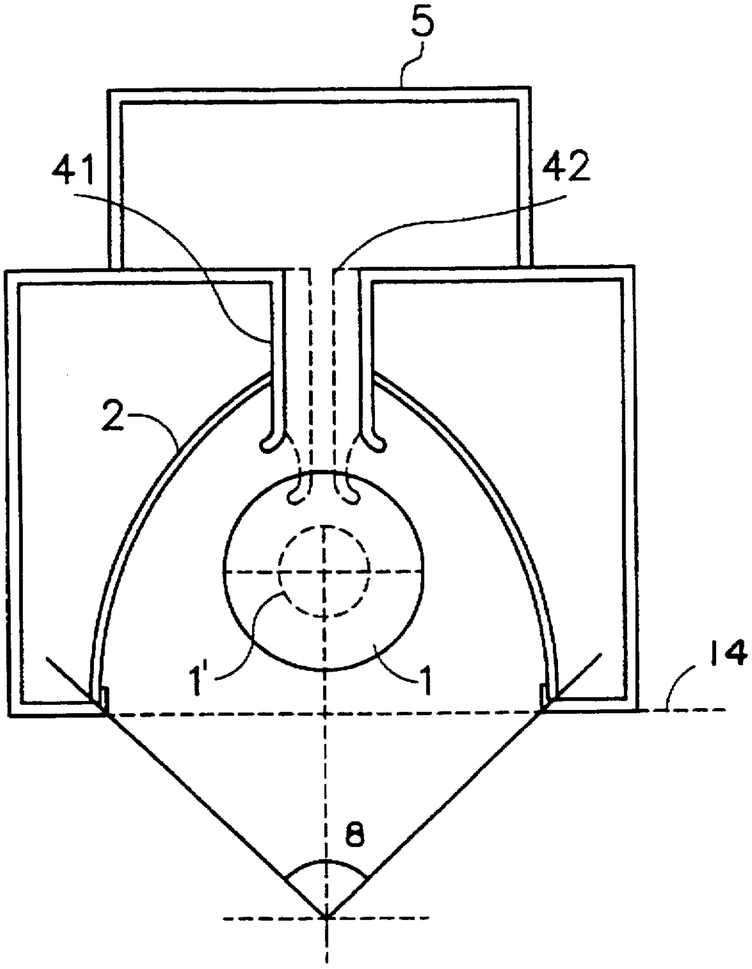
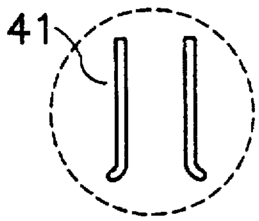
FIG. 4(a)
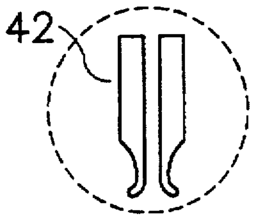
FIG. 4(b)

LIGHT IRRADIATOR

BACKGROUND OF THE INVENTION

1. Field of the Invention

The invention relates to a light irradiator for irradiation of a workpiece with ultraviolet rays for hardening, reforming or for other purposes. The invention relates especially to a light irradiator in which a high peak power can be obtained.

2. Description of Related Art

A light irradiator is used to irradiate a photoresist, ink of the photosetting type, resin and finish, for synthesis and for treatment of chemical substances. Furthermore, it is used for irradiation of a liquid crystal for purposes of surface treatment and for similar purposes.

FIG. 5 is a schematic of an example of a treatment device using a known light irradiator of the type to which the present invention is directed. In the drawing, a light irradiator 11 contains a rod-shaped light source 12, a focussing mirror 13, and a conveyor belt 14 feeds workpieces W which are irradiated with ultraviolet rays.

In the drawing, workpiece W located on the conveyor belt 14 is transported under the light irradiator 11 in steps on conveyor belt 14. Workpiece W is then irradiated with ultraviolet rays which are emitted from light source 12 and are concentrated by means of focussing mirror 13. As a result, the workpiece W or the like is hardened by the energy of the ultraviolet rays.

FIG. 6 is a schematic of an arrangement of lamp 12, mirror 13 and workpiece W for the light irradiator 11 shown in FIG. 5. The light source 12 consists of the light irradiator as well as the channeled focussing mirror 13 which has an oval-shaped cross section or the like. As is shown in the drawing, light source 12 is located at first focal point f1 of the ellipse of the focussing mirror. Workpiece W is located at second focal point f2 (or passes through the second focal point). The ultraviolet rays emitted from light source 12 are concentrated on the workpiece located at second focal point f2 after concentration by means of mirror 13.

FIG. 7(*a*) graphically depicts the illumination intensity at the second focal point of the above described light irradiator, which is diagrammatically shown to its left in FIG. 7(*a*). If, by means of an illumination meter, the illumination intensity is measured in the vicinity of the light irradiation point (second focal point) of the light irradiator, as is shown in FIG. 7(*a*), illumination intensity I(X) is obtained according to position X as is shown in FIG. 7(*b*).

In FIG. 7(*b*), the maximum illumination intensity is called the peak illumination intensity. The larger this peak illumination intensity, the more favorable it is for setting of resin of the photosetting type or in similar cases, even if there is the same integral light quantity.

This means that the photosetting time of workpiece W depends largely on the peak illumination intensity of the ultraviolet rays. The greater the peak illumination intensity, the more the treatment time can be shortened. Therefore, in the above described FIG. 5, by increasing the peak illumination intensity of the light irradiator, the transport speed of the conveyor belt can be increased, thus a host of workpieces can undergo ultraviolet treatment in a short time, so that the treatment efficiency can be increased.

Recently, therefore, the use of a light irradiator is expected which has a high emission intensity of the lamp and which, therefore, for example, has high irradiation intensity for setting.

The peak illumination intensity of the light irradiator is dictated by the following values:

(a) Light source tube diameter

By reducing the tube diameter, the degree of concentration at the second focal point can be increased and the peak illumination intensity increased, as is illustrated in FIG. 8.

(b) Angle θ which is formed by straight fines which arise between the second focal point and opening ends of the oval mirror (in FIG. 6)

The larger the above described angle θ, the more light can be concentrated, and the greater the peak illumination intensity which can be obtained. The above described angle θ, however, (for practical use) has an upper limit because the external shape of the light irradiator is limited by the arrangement of the device in which it is installed and cannot be excessively increased.

(c) Electrical input power into the light source

By increasing the input into the light source a high peak illumination intensity can be obtained because the output brightness thereof is increased.

As is described above, the peak illumination intensity can be increased if, while keeping the light-gathering power of the oval mirror constant (without reducing the above described angle θ), the lamp tube diameter can be reduced, or by increasing the input into the lamp, the output brightness thereof can be increased.

To increase the electrical input power of a high pressure lamp with a small tube diameter and the output brightness thereof, however, an effective cooling device for suppression of the temperature increase thereof is necessary. A device for effective cooling of the lamp with a small tube diameter, however, could not be obtained without reducing the above described angle θ. As a result, conventionally, a light irradiator with a high peak illumination intensity using a relatively narrow high pressure lamp could be not used in practice, and the desire for quick treatment of the workpiece could not be satisfied to an adequate degree.

SUMMARY OF THE INVENTION

In view of the above-described disadvantages of the prior art, a first object of the present invention is to provide a light irradiator with a high peak illumination intensity using a high pressure lamp with a high input power, and thus, to increase the speed for treatment of a workpiece.

A second object of the invention is to devise a light irradiator in which a lamp with a small tube diameter can be effectively cooled without reducing the light-gathering power of the oval mirror, in which an increase of the output brightness of the lamp is enabled and in which a high peak illumination intensity can be obtained.

A third object of the invention is to devise a light irradiator in which, regardless of the tube diameter of the lamp, an oval mirror with the same shape can be used, and in which a high peak illumination intensity can be obtained.

The above described objects are achieved according to the invention described by the fact that, in a light irradiator which has a channeled or elliptically cylindrical minor with an oval cross sectional shape, a rod-shaped lamp is located with its center at the first focal position of an ellipse formed by the above described mirror, and a lamp housing in which the above described lamp, mirror and an opening for light irradiation are located. Additionally, the above described lamp has a small tube diameter, the upper part of the mirror is provided with an opening, and a cooling nozzle penetrates the opening of the housing and has an inlet opening for cooling air in a position which is at a predetermined distance d from the lamp. Still further, a high electrical input power is supplied to the lamp and light with a high light intensity is emitted by drawing in air for cooling of the lamp from the inlet opening for cooling air of the cooling nozzle. A workpiece which is located in a second focal position of the ellipse formed by the mirror is irradiated with light with a high peak intensity.

The above described objects are, furthermore, achieved according to the invention described by the fact that the lamp is a high pressure lamp with a tube diameter (outside diameter) that is less than or equal to 18 mm, and that an electrical input power of at least 250 W/cm of unit length is supplied to the high pressure lamp.

The above described objects are, moreover, achieved according to the invention by the fact that the relationship $D \geqq 2d$ is satisfied where D is the minimum width of the cooling nozzle and d is the distance between the inlet opening for cooling air of the nozzle and the lamp.

Still further, the above described objects are achieved according to the invention by the fact that the mirror and the cooling nozzle are formed as separate individual parts, and that the width of the cooling nozzle and the position of the inlet opening for cooling air can be adjusted according to the tube diameter of the lamp.

Recently, high pressure lamps have been developed and gradually introduced into practice which have small tube diameters and which can supply a high electrical input power. In the case of using a high pressure lamp as the light source, conventionally, there is an opening for cooling air in the upper part of the oval mirror for cooling the lamp and the air is taken in as shown in FIG. 9. In particular, to supply a high electrical input power to the above described high pressure lamp with the small tube diameter and to acquire a high output brightness, the above described cooling device must work efficiently.

In this case the amount of lamp cooling depends on the speed of the cooling air which is passing through the vicinity of the lamp. The air speed is fixed by intermediate space d of the region through which the cooling air passes, as is shown in FIG. 9.

If the lamp diameter is reduced, in order to increase the peak illumination intensity without changing the size of the mirror (this means without changing the first focal position of the ellipse formed by the mirror) therefore, the intermediate space d between the inlet opening for cooling air and the lamp becomes large and the cooling efficiency of the lamp decreases.

Therefore, just reducing the tube diameter of the lamp cannot increase the electrical input power of the lamp and a high peak illumination intensity cannot be obtained. Furthermore the capacity of the fan which intakes cooling air is dependent on the above described width d and width D of the cooling nozzle. If width D of the cooling nozzle relative to width d is too small, the fan capacity becomes large. It is therefore necessary to select a suitable value for the value of the above described width d and at the same time to obtain a suitable ratio between the above described widths d and D.

On the other hand, the central longitudinal axis of the lamp must be in the first focal position of the elliptic shape of the mirror. If, while keeping the above described intermediate space d constant, the tube diameter of the lamp is reduced without changing the depth of the mirror (that is, without changing the height of the light irradiator) and without changing the distance between the mirror and the workpiece, the shape of the ellipse becomes longer than wide, as is illustrated in FIG. 10, and angle θ which is formed by the straight lines which arise between second focal point t2 and the open ends of the mirror becomes smaller. That is, angle $\theta L$ at a high lamp diameter is greater than angle $\theta s$ at a small lamp diameter, as is shown in FIG. 10.

Hence, it becomes clear that a high peak illumination intensity cannot be obtained if the tube diameter of the lamp is reduced, and accordingly, the shape of the mirror is changed because the angle θ is, likewise, reduced and the light gathering power decreases.

This means that, in order to reduce the tube diameter of the lamp and to increase the peak illumination intensity, it is necessary to satisfy the contradictory requirements that the cooling efficiency is not reduced (while keeping intermediate space d constant between the inlet opening for the cooling air and the lamp), and that the light-gathering power of the mirror is kept constant (that angle θ is kept constant without changing the shape of the ellipse.

According to the invention, therefore, the above described contradiction is eliminated by means of the measure in which there is a cooling nozzle which penetrates the opening located in the upper part of the mirror and in which the distance between the inlet opening thereof for cooling air and the lamp, regardless of the tube diameter of the lamp, can be kept constant at a predetermined value.

This means that, the measure by which the noted cooling nozzle is provided and by which its inlet opening for cooling air projects on the lamp side, the distance between the lamp and the inlet opening for cooling air of the cooling nozzle can be kept constant regardless of the tube diameter of the lamp, and therefore, the cooling efficiency can be maintained at an optimum value without changing the shape of the mirror, even if the tube diameter of the lamp becomes small.

As a result, use of a lamp with a small diameter and large electrical input power is enabled and a light irradiator with a high peak irradiation intensity can be achieved.

In this case, the capacity of the fan which intakes cooling air is increased if the set ratio between width D of the cooling nozzle and intermediate space d between the lamp and the inlet opening for cooling air of the cooling nozzle is not kept constant, as is described above.

Therefore, according to the invention the above described ratio between width D and intermediate space d is fixed at $D \geqq 2d$. This means that width D of the cooling nozzle must be at least twice as large as the above-described intermediate space d since the cooling air passes through intermediate space d, between the cooling nozzle located on both sides of the lamp and the inlet opening for cooling air, and thus, flows into the cooling nozzle. The resistance of the line for the cooling air can be reduced by fixing the ratio in this way and the capacity of the fan which intakes the cooling air can be reduced.

Furthermore, the same mirror can be used for lamps with different tube diameters by providing several interchangeable cooling nozzles for which the above described width D and the length of the nozzle have been chosen to have different values, or cooling nozzles in which the above described width D and the length are adjustable, a particular one of the cooling nozzles being chosen according to the tube diameter of the lamp, and by which width D and the length are appropriately adjusted.

In addition, width D must be smaller than the tube diameter of the lamp since the cooling efficiency decreases when the above described width D is greater than the tube diameter of the lamp.

According to the invention, based on the above described principle, a light irradiator with a high peak illumination intensity is achieved by the measure in which the upper part of the mirror has an opening from which a cooling nozzle with an inlet opening for cooling air projects to a position which is located at a set distance d from the above-described lamp, and in which a high electrical input power is supplied to the lamp and light is emitted with a high light intensity by drawing in air for cooling of the lamp into the inlet opening of the cooling nozzle. Because light with a high peak intensity can be emitted, thus, the speed for treatment of the workpiece can be increased.

Furthermore, according to the invention, a need to increase the outside dimensions of the device is avoided by the fact that the same size of mirror as the conventional one can be used.

In addition, the structural degree of freedom of the device can be increased according to the invention by the fact that the tube diameter of the lamp can be chosen independently of the shape of the mirror.

In the invention, by means of the measure by which the lamp is a high pressure lamp with an external tube diameter of less than or equal to 18 mm, and by which an electrical input power of at least 250 W/cm of unit length is supplied to the above described high pressure lamp, a peak illumination intensity which is necessary for fast treatment of the workpiece can be adequately obtained.

In the invention, the resistance of the line for the cooling air can be reduced and the lamp can be efficiently cooled without using a fan with a large capacity by means of the measure by which the condition $D \geqq 2d$ is satisfied, where D is the minimum width of the cooling nozzle and d is the distance between the cooling air inlet opening of the nozzle and the lamp.

In the invention, the tube diameter of the lamp can be easily changed since the mirror and the cooling nozzle are formed as separate individual parts and by which the width of the cooling nozzle and the position of the inlet opening for cooling air can be adjusted according to the tube diameter of the lamp. In particular, the user can easily undertake adjustments as required by the fact that the same mirror can be used even if the tube diameter of the lamp changes. Furthermore, the cost of the light irradiator can be reduced thereby.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 4 is a cross section of a second embodiment of the invention with FIGS. 4*a* and 4*b* being enlarged detail views of two nozzles for use therein;

DETAILED DESCRIPTION OF THE PREFERRED EMBODIMENTS

Figure 1A:
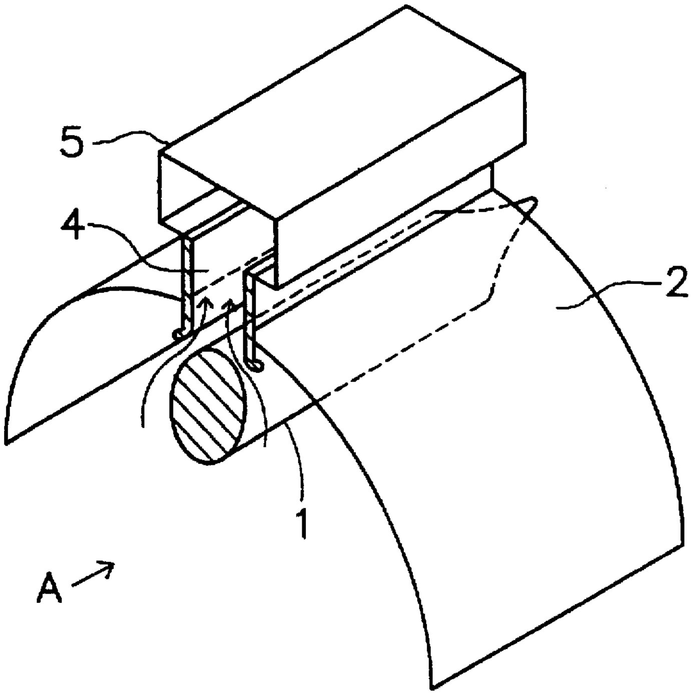
FIG. 1*a* is a schematic prospective view of a first embodiment of the invention with FIG. 1*b* being a view in the direction of arrow A in FIG. 1(*a*)
Figure 1B:
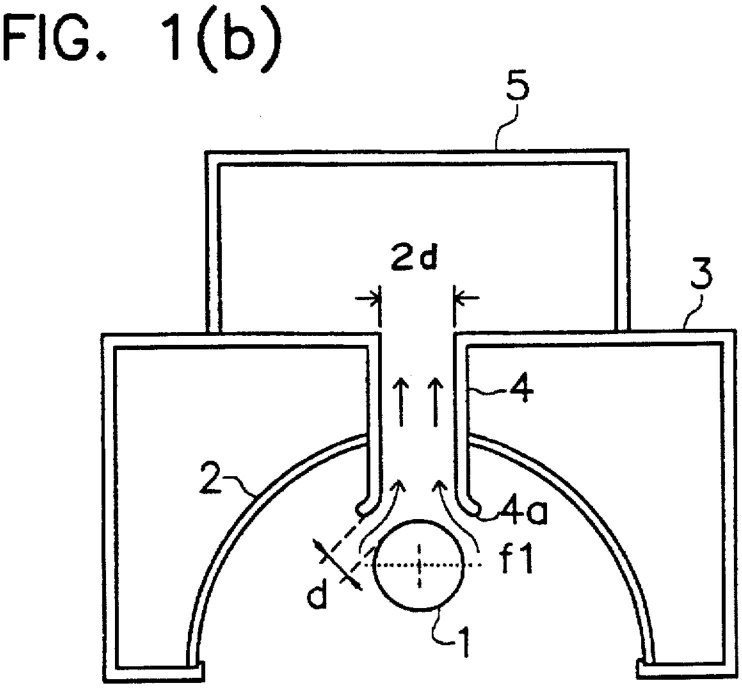

FIG. 1 schematically shows a light irradiator according to a first embodiment of the invention with FIG. 1(*a*) being a perspective view of the light irradiator and FIG. 1(*b*) being a view in the direction of arrow A in FIG. 1(*a*). In FIG. 1(*a*) a lamp housing covering the focussing mirror 2 is not shown.

The lamp 1 comprises a rod-shaped high pressure lamp tube with electrodes or the like, and the focussing mirror has a cross section of a partially elliptical shape. The lamp 1 is located in a first focal position of the partially elliptical shape of the focussing mirror. Ultraviolet rays which are emitted from lamp 1 are concentrated on a workpiece which is located at a second focal position of the elliptic shape (or passes through the position as was described above).

In order to increase the peak illumination intensity, it is advantageous for the tube diameter of lamp 1 to be small. If the required peak illumination intensity, the capacity of the fan which intakes cooling air, the tube diameter of a high pressure lamp with electrodes which can be used for practical purposes, and an upper limit on the size of the electrical input power which can be supplied to the high pressure lamp electrodes, and the like, are considered, it is desirable that the tube diameter of the lamp be roughly 10 mm to 12 mm. Furthermore, a cooling nozzle 4 is provided to draw a flow of cooling air into an air duct 5. Cooling nozzle 4 projects toward one side of lamp 1, as is shown in the drawing.

An intermediate space between lamp 1 and cooling air inlet opening 4*a* of the cooling nozzle 4 is fixed at d. Furthermore, width (diameter) D of the cooling nozzle is fixed at $D \geqq 2d$. The cooling air is drawn, in succession, through the intermediate space of width d, cooling nozzle 4 and air duct 5 by means of a fan which is not shown in the drawing.

Figure 2:
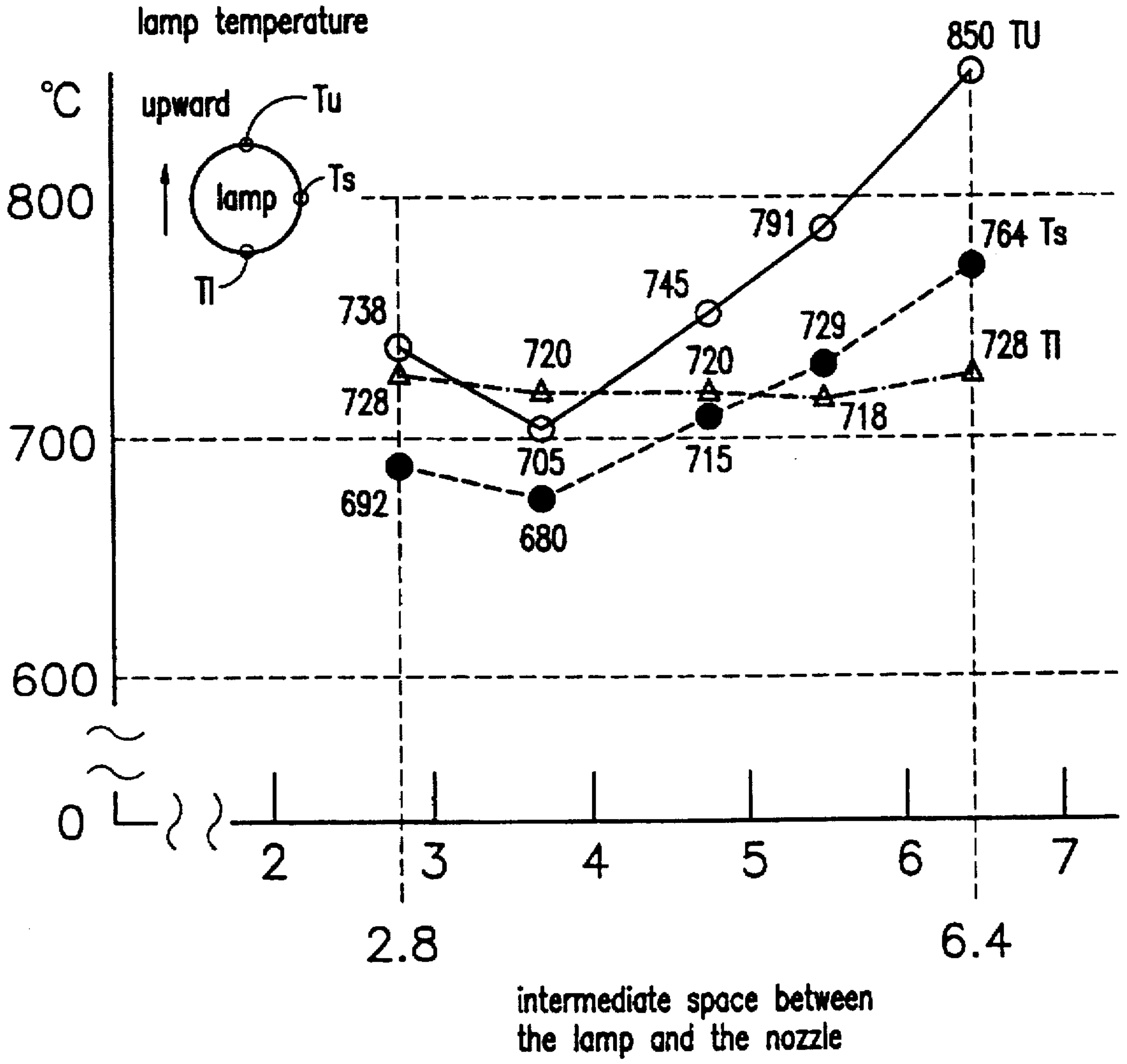
FIG. 2 graphically depicts changes of the surface temperature of the lamp occurring as the distance d is changed.
Figure 3:
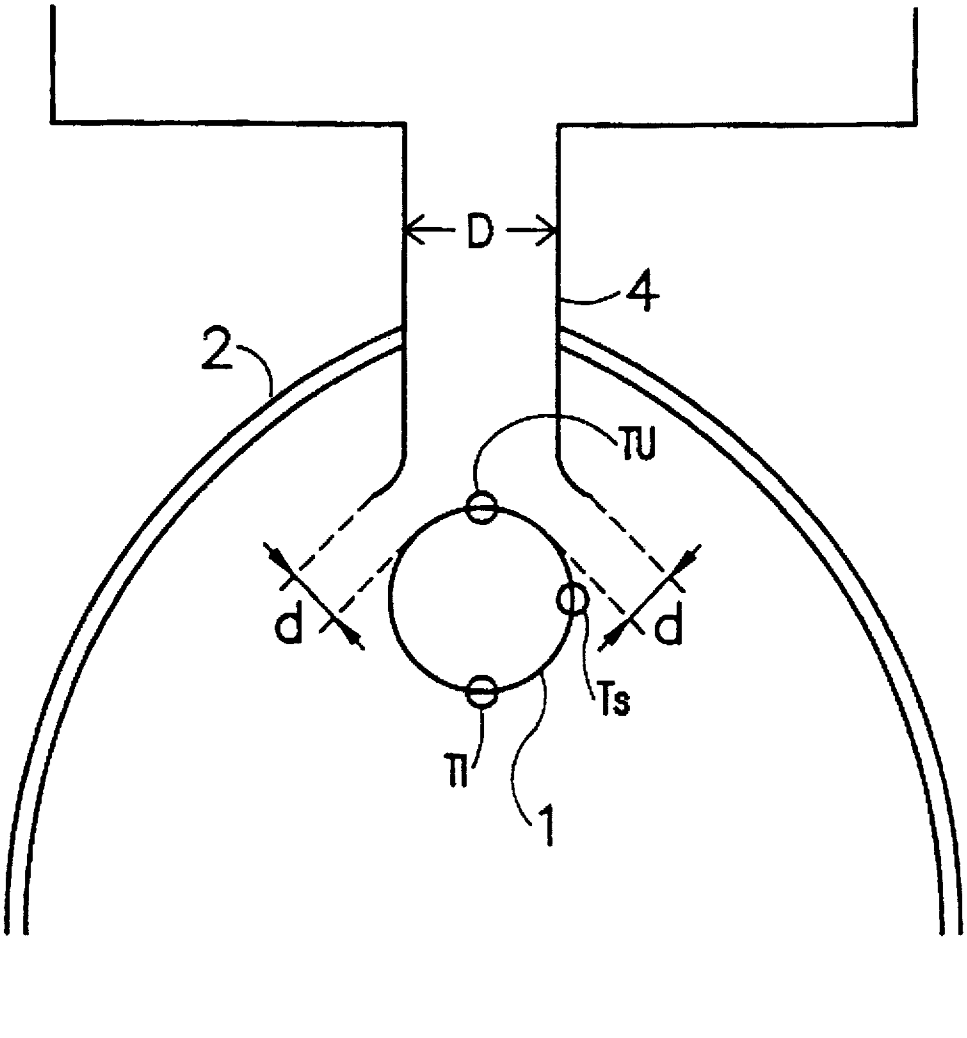
FIG. 3 schematically shows the measurement parameters, such as a temperature measurement position, relating to the data depicted in FIG. 2.
Figure 5:
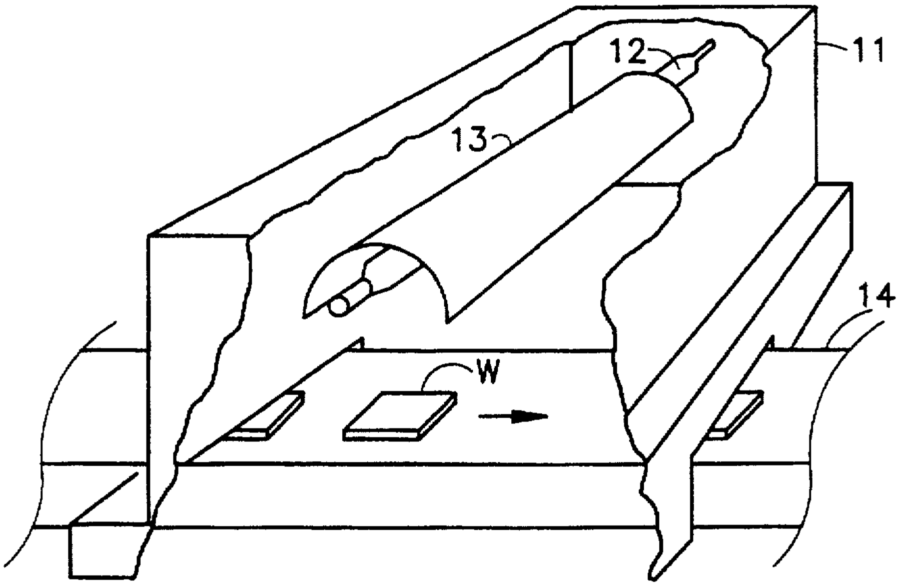
FIG. 5 shows a schematic of one example of a treatment device using a light irradiator.
Figure 6:
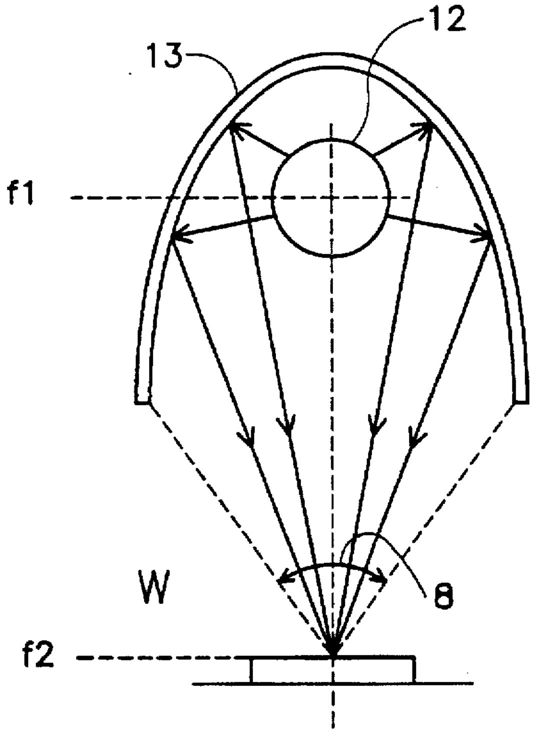
FIG. 6 shows a schematic of an arrangement of a lamp, a mirror, and a workpiece in the light irradiator.
Figure 7A:
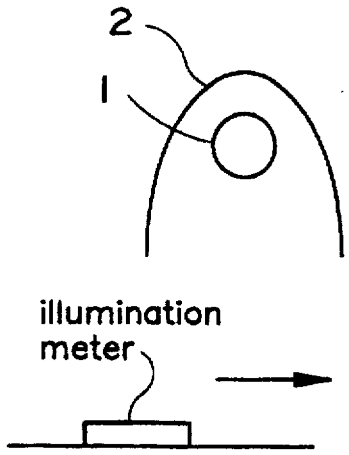
FIG. 7(*b*) shows a graphic representation of the peak irradiation intensity of the light irradiator as a function of position x with reference to the diagram of FIG. 7(*a*)
Figure 7B:
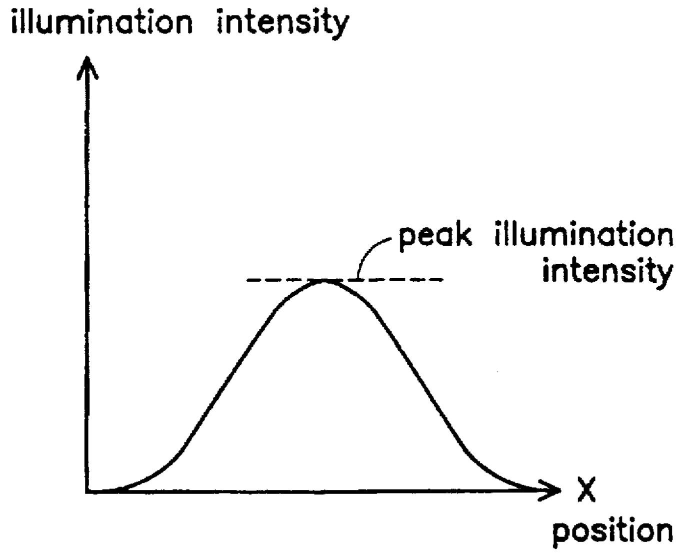
Figure 8A:
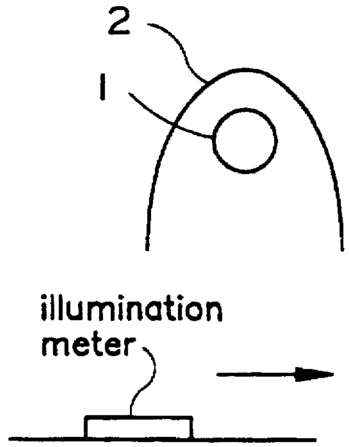
FIG. 8(*b*) shows a graphic representation of the peak illumination intensity of the light irradiator as a function of position x with reference to the diagram of FIG. 8(*a*)
Figure 8B:
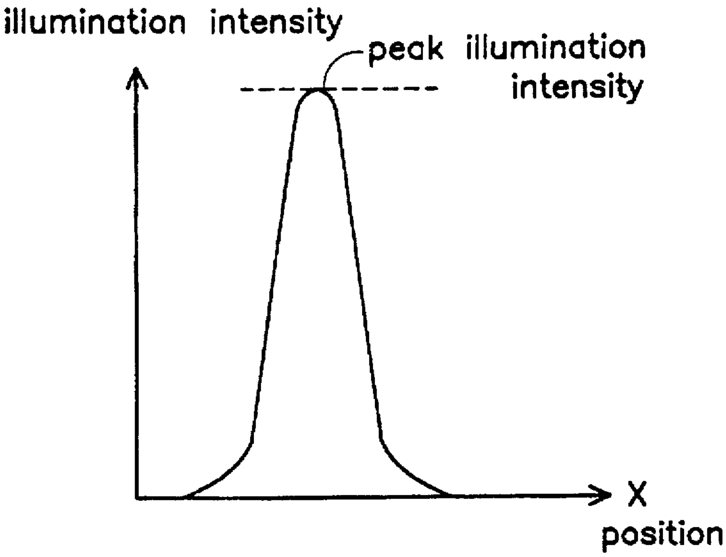
Figure 9:
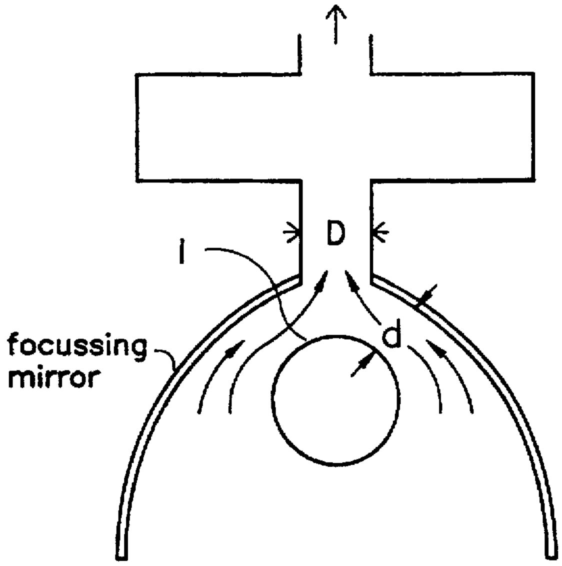
FIG. 9 schematically depicts the process of cooling the lamp.

FIG. 2 is a graphic representation of changes of the surface temperature of the lamp as a function of the distance d between the cooling air inlet opening 4*a* of the cooling nozzle 4 and the lamp 1 is changed from 2.8 to 6.4, while width D of the cooling nozzle is kept constant. In the drawing, reference symbols Tu, Ts and T1 designate the temperature of the upper region, the temperature of the side region, and the temperature of the lower region of the lamp respectively, as is shown in FIG. 3 (the cooling air is drawn toward the upper side of the lamp 1). In the representation, the x-axis illustrates the width of intermediate space d between the cooling air inlet opening 4*a* and the lamp 1, and the y-axis is the temperature in °C. The width of intermediate space d was changed from 2.8 to 6.4, and the measurements were taken under the following conditions:

* tube diameter of the lamp . . . 18 mm
* lamp input . . . 7 kW (280 W/cm: electrical input power per cm of lamp)
* fan . . . 750 W
* pipeline . . . 175 mm diameter As is apparent from the drawing, cooling is done most efficiently when d is about 3.5 mm and D is slightly greater than 2*d*. It becomes apparent that, in this case, the maximum temperature of the lamp can be suppressed to roughly 720° C., and that the temperature difference of the lamp surface is the lowest.

Figure 10:
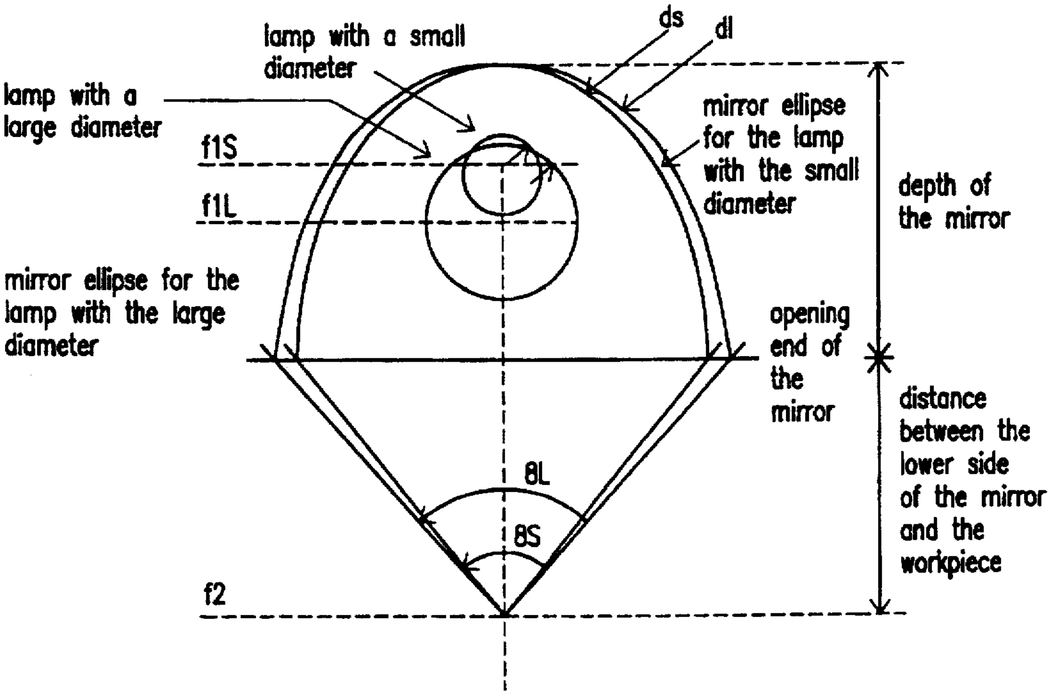
FIG. 10 schematically shows a change in the shape of the mirror associated with a change in the lamp diameter.

If, in this case, when d is set at 3.5 mm, as is described above, and the cooling nozzle does not project toward the lamp, the elliptic shape formed by the mirror becomes longer (higher) than wide, as was described above using FIG. 10. In this case, obtaining of the angle θ of the mirror opening necessary for peak illumination intensity cannot be ensured.

At diameters of 26 mm, 18 mm and 14 mm, in the case of supplying the same electrical input power and maintaining the same minor shape (that is, at the same angle θ), at a diameter of 18 mm, a peak illumination intensity could be obtained which is roughly 1.3 times higher than at a diameter of 26 mm. At a diameter of 14 mm the peak illumination intensity could be obtained which is 1.8 times higher than at a diameter of 26 min. At a diameter of less than 10 mm the temperature of the tube wall of the lamp rose above 950° C. and the lamp could no longer be used if using the coolant according to the invention and an electrical input power of greater than or equal to 250 W/cm has been supplied.

From the above described experimental results, it was possible to confirm that the measure in which cooling nozzle 4 projects from the mirror, and in which the intermediate space between lamp 1 and the cooling air inlet opening of cooling nozzle 4 can be set at a suitable value, the lamp can be cooled to a degree of practical utility and a light irradiator with a high peak illumination intensity can be achieved, even if a high electrical input power is supplied to a lamp with a small tube diameter and emission with high brightness is effected.

As is described above, in this embodiment, by means of the measure by which the cooling nozzle projects from the mirror, and by which the intermediate space between the lamp and cooling air inlet opening of the cooling nozzle is set at a suitable value, a lamp with a small tube diameter can be efficiently cooled without reducing the light gathering power of the mirror. Therefore, a high electrical input power can be supplied to a small diameter mercury lamp provided with electrodes, emission with high brightness can be effected, and thus, high peak illumination intensity obtained.

FIG. 4 shows a schematic of a second embodiment of the invention in which the cooling nozzle can be replaced according to the tube diameter of the lamp. The same parts as in FIG. 1 are provided with the same reference numbers as in FIG. 1. In the figure, focussing mirror 2 and cooling nozzle 1 are formed as separate individual parts. For the cooling nozzle, for example, a first cooling nozzle 41 (FIG. 4*a*) for a lamp of large diameter (solid line lamp 1 in FIG. 4) and a second cooling nozzle 42 for a lamp with a small diameter (dash line lamp 1' in FIG. 4) are provided. In this way, by selection of a nozzle of appropriate size, the intermediate space between the lamp and the inlet opening for the cooling air of the cooling nozzle is kept constant By means of the above described arrangement, for changes of the lamp diameter, a suitable measure can be taken without changing the mirror simply by replacing the cooling nozzle, and a suitable measure can be easily taken for the varied requirements of the user. Furthermore, the cost of the light irradiator can be reduced, since only a single mirror needs to be provided, instead mirrors of different sizes needing to be produced.

In the above described embodiment, an example is shown in which the cooling nozzle is replaced according to the tube diameter of the lamp. However, a cooling nozzle can also be used which is formed such that its length and width are adjustable. For example, the nozzle could be formed of telescoping sections or provided with an adjustable baffle.

In the above described first and second embodiments, a channeled-shaped mirror with a partially elliptical cross-sectional shape is used. However, an elliptically cylindrical mirror can also be used, the workpiece being located at the second focal position within the elliptical cylinder and being moved in the longitudinal direction of the elliptical cylinder.

Action of the invention

As described above, the following actions can be obtained according to the invention:

(1) Irradiation of the workpiece with light with a high peak intensity with effective cooling of the lamp with a small diameter is enabled, and thus, the speed for treatment of the workpiece can be increased by the measure in which there is a cooling nozzle which projects from the mirror and has a cooling air inlet opening positioned at a set distance d from the lamp, and in which a high electrical input power is supplied to the lamp and light emitted with high light intensity by drawing air for cooling the lamp into the cooling air inlet opening of the cooling nozzle. Furthermore, according to the invention the outside dimension of the device is prevented from becoming large since the same size of the mirror can be used as is used with conventional irradiator devices. In addition, the structural degree of freedom of the device can be increased according to the invention by the fact that the tube diameter of the lamp can be chosen regardless of the shape of the mirror.

(2) The resistance of the line for the cooling air can be reduced according to the invention by satisfying condition $D \geqq 2d$ where D is the minimum width of the cooling nozzle and d is the distance between the cooling air inlet opening of the nozzle and lamp. The lamp can thus be efficiently cooled without using a high capacity fan.

(3) According to the invention, a suitable measure can be easily taken to change the tube diameter of the lamp by forming the mirror and the cooling nozzle as separate individual parts to thereby enable the width of the cooling nozzle and the position of the cooling air inlet opening to be adjusted according to the tube diameter of the lamp. In particular, a suitable measure can be easily taken for the diverse requirements of the user by the fact that the same mirror can be used, even if the tube diameter of the lamp changes, by selection of an appropriate one of a plurality of differently sized nozzles or by adjusting a size-adjustable nozzle. Furthermore, the cost of the light irradiator can be reduced thereby.

It is to be understood that although preferred embodiments of the invention have been described, various other embodiments and variations may occur to those skilled in the art. Any such other embodiments and variations which fall within the scope and spirit of the present invention are intended to be covered by the following claims.

What we claim is:

1. Light irradiator having an elongated mirror with a cross section of an at least partially elliptical shape, a rod-shaped lamp with a center axis located at a first focal position of the at least partially elliptical shape of the mirror, and a lamp housing containing said mirror and lamp; wherein said mirror has a cooling opening at a vertex of the at least partially elliptical shape; wherein a cooling nozzle with an inlet for cooling air is positioned in said cooling opening projecting toward said lamp, said inlet being located a predetermined distance from said lamp; and wherein a workpiece to be irradiated is located at a second focal position of the at least partially elliptical shape of the mirror; and wherein the lamp is a high voltage lamp with an external tube diameter of less than or equal to 18 mm and wherein an electrical input source of at least 250 W/cm per unit length is connected to said high voltage lamp.

2. Light irradiator according to claim 1, wherein the cooling nozzle has a minimum internal width D and the inlet opening of the cooling nozzle is spaced from the lamp by a distance d in accordance with the relationship D≧2d.

3. Light irradiator according to claim 2, further comprising means for adjusting the minimum internal width of the cooling nozzle and a position of the inlet opening relative to the mirror as a direct function of the external tube diameter of the lamp in which the minimum internal width of the cooling nozzle increases and decreases with increases and decreases in the external tube diameter of the lamp.

4. Light irradiator according to claim 3, wherein said means for adjusting comprises the mirror and the cooling nozzle being formed as separate individual parts and a plurality of selectively interchangeable cooling nozzles of different sizes being provided.

5. Light irradiator according to claim 1, further comprising means for adjusting a minimum internal width of the cooling nozzle and a position of the inlet opening relative to the mirror as a direct function of the external tube diameter of the lamp in which the minimum internal width of the cooling nozzle increases and decreases with increases and decreases in the external tube diameter of the lamp.

6. Light irradiator according to claim 5, wherein said means for adjusting comprises the mirror and the cooling nozzle being formed as separate individual parts and a plurality of selectively interchangeable cooling nozzles of different sizes being provided.

7. Light irradiator having an elongated mirror with a cross section of an at least partially elliptical shape a rod-shaped lamp with a center axis located at a first focal position of the at least partially elliptical shape of the mirror, and a lamp housing containing said mirror and lamp; wherein said mirror has a cooling opening at a vertex of the at least partially elliptical shape; wherein a cooling nozzle with an inlet for cooling air is positioned in said cooling opening projecting toward said lamp, said inlet being located a predetermined distance from said lamp; and wherein a workpiece to be irradiated is located at a second focal position of the at least partially elliptical shape of the mirror; and wherein the cooling nozzle has a minimum internal width D and the inlet opening of the cooling nozzle is spaced from the lamp by a distance d in accordance with the relationship D≧2d.

8. Light irradiator according to claim 7, further comprising means for adjusting the minimum internal width of the cooling nozzle and a position of the inlet opening relative to the mirror as a direct function of the external tube diameter of the lamp in which the minimum internal width of the cooling nozzle increases and decreases with increases and decreases in the external tube diameter of the lamp.

9. Light irradiator according to claim 8, wherein said means for adjusting comprises the mirror and the cooling nozzle being formed as separate individual parts and a plurality of selectively interchangeable cooling nozzles of different sizes being provided.

10. Method of irradiating a work piece with high intensity light comprising the steps of providing an elongated mirror with a cross section of an at last partially elliptical shape, positioning a rod-shaped lamp with a center axis thereof at a first focal position of the at least partially elliptical shape of the mirror, projecting a cooling nozzle having an inlet for cooling air through a cooling opening of the mirror that is located at a vertex of the at least partially elliptical shape and positioning the inlet of the cooling nozzle a predetermined distance from said lamp, locating a workpiece to be irradiated at a second focal position of the at least partially elliptical shape of the mirror, supplying an electrical input to the lamp to emit light hiving a peak intensity therefrom, and irradiating the workpiece with the peak intensity of the light emitted from the lamp; wherein a lamp with an external tube diameter of less than or equal to 18 mm is used; and wherein an electrical input of at least 250 W/cm per unit length is supplied to said lamp.

11. Method of irradiating a work piece according to claim 10, wherein, for rendering said irradiating step independent of external lamp diameter, a minimum internal width of the cooling nozzle and a position of the inlet opening relative to the mirror are adjusted as a direct function of the external tube diameter of the lamp, with the minimum internal width of the cooling nozzle being increased and decreased with increases and decreases in the external tube diameter of the lamp.

12. Method of irradiating a work piece according to claim 11, wherein said adjusting step is performed by selecting an appropriate one of a plurality of interchangeable cooling nozzles of different sizes.

13. Method of irradiating according to claim 12, wherein the selecting of an appropriate cooling nozzle is performed in accordance with the relationship D≧2d, where D is a minimum internal width of the cooling nozzle selected and d is a spacing of the inlet opening of the selected cooling nozzle from the lamp.

* * * * *